Patented July 25, 1950

2,516,826

UNITED STATES PATENT OFFICE 2,516,826

PROCESS FOR CATALYTIC SEMIHYDROGENATION OF TERTIARY ACETYLENIC MONOHYDRIC ALCOHOLS

Everet Foy Smith, Terre Haute, Ind., assignor to Commercial Solvents Corporation, Terre Haute, Ind., a corporation of Maryland No Drawing. Application October 4, 1945,
Serial No. 620,407

2 Claims. (Cl. 260—642)

The present invention relates to a method for the preparation of tertiary olefinic monohydric alcohols. More particularly, it pertains to a process for producing such alcohols by the selective catalytic hydrogenation of the corresponding acetylenic alcohols.

This application is a continuation-in-part of my application, Serial No. 498,733, filed August 14, 1943, and now abandoned.

Numerous applications have been found for olefinic alcohols, either as such, or as intermediates in the synthesis of other organic compounds. For example, 2-methyl-3-butene-2-ol may be dehydrated to isoprene, which may in turn be polymerized under various conditions to produce several different types of rubber-like products. In the past, however, the olefinic alcohols have been seriously limited in use because of the difficulty of producing them.

The most readily available raw materials for the production of olefinic alcohols are the corresponding acetylenic alcohols, which are prepared by condensing aldehydes and ketones with acetylenic hydrocarbons having an unreplaced hydrogen atom in the 1-position. Such acetylenic alcohols have been reduced chemically to the olefinic alcohols, but the process is both expensive and inconvenient.

I have now discovered that tertiary olefinic monohydric alcohols may be consistently produced in yields of 90 per cent and above by the selective catalytic hydrogenation of the corresponding tertiary acetylenic alcohols in the liquid phase over palladium catalysts selected from the class consisting of palladium black, palladium supported on charcoal and palladium supported on alumina. In carrying out my invention, a charge consisting of acetylenic alcohol and catalyst, with or without a solvent for the acetylenic alcohol which is inert under the conditions of the hydrogenation, is placed in a hydrogenation apparatus of conventional design, and hydrogen is introduced and maintained at a pressure ranging from about 15 to 500 pounds per square inch, absolute, or higher. Throughout the hydrogenation period, it is desirable to agitate the reaction mixture by any convenient means. The hydrogenation is preferably continued until substantially all of the acetylenic alcohol has been hydrogenated. This point may be ascertained by periodically withdrawing samples from the hydrogenation chamber and testing the hydrogenated liquid by known methods for the presence of compounds containing an acetylenic linkage. For example, alcohols containing an unreplaced acetylenic hydrogen atom are known to produce a white precipitate with ammoniacal silver nitrate, whereas the corresponding olefinic alcohols do not react in such manner. After the hydrogenation has been carried to the desired point, the hydrogenated liquid is removed from the apparatus, and the desired olefinic alcohol is isolated in a known manner, such as by distillation or crystallization. If desired, the olefinic alcohol content of the crude hydrogenated liquid may be readily determined by rapid titration with a standard solution of bromine. Such analysis is based upon the fact that bromine is rapidly and quantitatively absorbed by the olefinic alcohol, but is substantially unreactive towards the corresponding acetylenic and saturated alcohols.

As the catalyst in my process, I have employed palladium in the form of palladium black, and in the form of the metal supported on the carriers charcoal and alumina. I have observed that these catalysts give substantially identical results. In the semihydrogenation of tertiary acetylenic monohydric alcohols, I have observed that palladium catalysts of the type described give yields greatly superior to the yields produced by other hydrogenation catalysts in common use, such as platinum, Raney nickel, and copper. I have also observed that these palladium catalysts have an exceptionally long life, and may be used numerous times in the semihydrogenation of tertiary acetylenic alcohols before their activity is appreciably impaired.

The proportion of catalyst required varies according to the type of catalyst used, but ordinarily lies within the range of about 0.01 to 5.0 per cent, based upon the weight of acetylenic alcohol present.

The temperature utilized will be found to vary widely, depending upon a number of process variables, such as the type of catalyst, the proportion of catalyst, the hydrogen pressure, and the effectiveness of agitation. I find, in general, that with my palladium catalysts, temperatures from about 0° to 100° C. may be used, and that optimum results are obtained in the range 40° to 60° C.

Although tertiary acetylenic monohydric alcohols may be selectively hydrogenated in accordance with my invention to the corresponding olefinic alcohols in the absence of water or other inert solvent, I prefer, chiefly in the interest of safety and operational convenience, to carry out the hydrogenation of a mixture of acetylenic alcohol and water containing approximately 50% water. This practice permits the removal of the resulting olefinic alcohol from the reaction mixture by fractional distillation of its azeotrope with water. Simultaneously, there is removed the small quantity of saturated alcohol produced by the hydrogenation, which likewise forms an azeotrope with water, boiling at approximately the same temperature. When all of the alcohols have been separated from the hydrogenation mixture in this manner, a mixture of catalyst and water remains in the still. The presence of a residual quantity of water in the still at this point is highly desirable, in order to minimize the pyrophoric nature of the palladium catalyst. The distillate, comprising olefinic alcohol, saturated alcohol, and water, may be dehydrated by suitable means, such as by azeotropic distillation with benzene, and the resultant anhydrous mixture may then be subjected to careful fractionation in an efficient distillation system to isolate the olefinic alcohol in substantially pure form.

As may be inferred from the foregoing description, my invention may be generally applied to the semihydrogenation of substantially any tertiary acetylenic monohydric alcohol to the corresponding olefinic alcohol. For illustration, the following tertiary acetylenic alcohols are mentioned as being typical of such compounds: 3,5-dimethyl-1-hexyne-3-ol, 2-methyl-3-butyne-2-ol, 3-methyl-4-pentyne-3-ol, 2-phenyl-3-butyne-2-ol and 3-ethyl-4-pentyne-3-ol.

For the semihydrogenation of monohydric acetylenic alcohols which form an azeotrope with water, I prefer to use a semicontinuous process carried out in a closed system, so designed as to prevent any contact of the catalyst with the atmosphere. The use of a closed system is especially desirable with palladium catalyst, in order to reduce fire hazard and mechanical losses. Briefly, the application of semicontinuous methods to my invention may be carried out by introducing into a suitable hydrogenation apparatus a charge consisting of the acetylenic alcohol, water, and the catalyst, in the desired proportions. Hydrogen is then introduced under the conditions previously described, preferably until substantially all of the acetylenic alcohol has been reduced, as determined by the procedure referred to above. The resultant mixture, without removal of the catalyst, is then transferred through a suitable conduit to a still, by the use of a pump or any other convenient means, where the olefinic and saturated alcohols are distilled off in the form of azeotropes with water, leaving residual water and catalyst in the still kettle. A fresh charge of acetylenic alcohol is then introduced, together with a quantity of water equal to the amount distilled out with the odefinic alcohol, and the mixture is pumped back to the hydrogenation unit for the succeeding cycle.

My invention may be more specifically illustrated by the following examples:

*Example I*

A mixture of 82.0 grams of 2-methyl-3-butyne-2-ol, 190 ml. of water, and 0.350 gram of palladium black was introduced into a suitable hydrogenation unit and subjected to hydrogenation at a pressure of 50 pounds per square inch, gage, and at a temperature of 15° C. After 1.08 moles of hydrogen had been absorbed per mole of acetylenic alcohol charged, the hydrogenation was discontinued, and the reaction product was removed from the autoclave. Analysis of the product by known methods revealed that the olefinic alcohol, 2-methyl-3-butene-2-ol, had been produced in 91% yield, based on the acetylenic alcohol utilized.

*Example II*

A mixture of 83.0 grams of 2-methyl-3-butyne-2-ol, 190 ml. of water, and 1.4 grams of 5% palladium on charcoal was introduced into a suitable hydrogenation unit and subjected to hydrogenation at a pressure of 50 pounds per square inch, gage, and at a temperature of 15° C. After 1.06 moles of hydrogen had been absorbed per mole of acetylenic alcohol charged, the hydrogenation was discontinued, and the reaction product was removed from the autoclave. Analysis of the product by known methods showed that the olefinic alcohol had been produced in 93% yield, based on the acetylenic alcohol utilized.

*Example III*

A mixture of 82.3 grams of 2-methyl-3-butyne-2-ol, 190 ml. of water, and 1.4 grams of 5% palladium on alumina was introduced into a suitable hydrogenation unit and subjected to hydrogenation at a pressure of 50 pounds per square inch, gage, and at a temperature of 15° C. After 1.07 moles of hydrogen had been absorbed per mole of acetylenic alcohol charged, the hydrogenation was discontinued, and the reaction product was removed from the autoclave. Analysis of the product by known methods showed that the olefinic alcohol had been produced in 94% yield, based on the acetylenic alcohol utilized.

*Example IV*

A mixture of 355 parts of 3,5-dimethyl-1-hexyne-3-ol, 300 parts of methanol, and 2 parts of 5% palladium on charcoal was placed in a suitable hydrogenation unit and subjected to hydrogenation at a pressure of 50 pounds per square inch, gage, and at a temperature of 18° C. When tests indicated the total disappearance of acetylenic alcohol, the hydrogenation was discontinued, the reduction mixture was filtered and fractionated, and a liquid boiling between 146° and 152° C. was isolated and identified as 3,5-dimethyl-1-hexene-3-ol by bromine titration. The yield of olefinic alcohol was calculated to be 98% of theoretical, based on the quantity, of 3,5-dimethyl-1-hexyne-3-ol utilized.

*Example V*

A mixture consisting of 300 parts of 2-methyl-3-butyne-2-ol, 300 parts of water, and 2 parts of 5% palladium on charcoal was placed in an autoclave, and the autoclave was sealed. Hydrogen was then introduced to a pressure of 50 pounds per square inch, gage, and the mixture was heated to 50° C. and agitated until the last trace of 2-methyl-3-butyne-2-ol had disappeared. The hydrogenation was then stopped, the mixture was filtered and distilled, and the fraction boiling around 90° C. was dried by azeotropic distillation with benzene. Analysis of the anhydrous distillate indicated that the olefinic alcohol had been produced in 90% yield.

*Example VI*

Into a suitable hydrogenation unit was introduced a mixture consisting of 190 parts of 2-methyl-3-butyne-2-ol, 560 parts of water, and 2 parts of 5% palladium on charcoal. This mixture was hydrogenated at a pressure of 50 pounds per square inch, gage, and at a temperature of 18° C. When all of the acetylenic alcohol had disappeared, the hydrogenation was stopped, the crude product was pumped to a still kettle, and the mixture was distilled through an efficient fractionating column up to a vapor temperature of 96° C. The distillate was dried by azeotropic distillation with benzene, and then carefully refractionated to isolate the olefinic alcohol. The still residue was measured, a new charge of 2-methyl-3-butyne-2-ol and the proper quantity of make-up water were added, and the mixture was then pumped from the still kettle to the hydrogenation unit for the succeeding cycle.

It is to be specifically understood that the above series of examples are merely illustrative, and are to be in no way construed as limiting my invention. Broadly, my invention resides in the discovery that tertiary monohydric acetylenic alcohols, in general, may be reduced in high yields to the corresponding olefinic alcohols, by the utilization of palladium catalysts. In general, it may be said that the use of any equivalents or modifications of procedure which would normally occur to one skilled in the art, is included in the scope of my invention.

Having now described my invention, I claim:

1. A process for the semicontinuous production of tertiary olefinic monohydric alcohols from the corresponding acetylenic alcohols which comprises subjecting to partial hydrogenation an aqueous solution of a tertiary monohydric acetylenic alcohol which forms an azeotrope with water, in the presence of a selective hydrogenation catalyst chosen from the group consisting of palladium black, palladium supported on charcoal, and palladium supported on alumina, at a temperature within the range of about 0° to 100° C. and at a hydrogen pressure within the range of about 15 to 500 pounds per square inch absolute, transferring the entire resultant hydrogenated mixture in a closed system from the hydrogenation unit to a still kettle without contact with the atmosphere, removing the desired olefinic alcohol from the latter by distillation as the water azeotrope leaving residual water and catalyst in the still, adding acetylenic alcohol and additional water to the still residue, and thereafter transferring the resultant mixture including the catalyst in a closed system to the hydrogenation unit for the succeeding cycle.

2. A process as in claim 1 in which the acetylenic alcohol is 2-methyl-3-butyne-2-ol and the olefinic alcohol is 2-methyl-3-butene-2-ol.

EVERET FOY SMITH.

REFERENCES CITED

The following references are of record in the file of this patent:

UNITED STATES PATENTS

| Number | Name | Date |
|---|---|---|
| 2,300,598 | Schnabel | Nov. 8, 1942 |
| 2,333,216 | Trieschmann | Nov. 2, 1943 |

FOREIGN PATENTS

| Number | Country | Date |
|---|---|---|
| 288,271 | Germany | Oct. 3, 1915 |

OTHER REFERENCES

Chemical Abstracts, vol. 28, pages 1669–70 (1934). Abstract of article by Zalkind, Vishyakov and Morev from Journal of General Chemistry (U. S. S. R.), vol. 3, pages 91–113 (1933).